Oct. 9, 1956          A. S. PARKS        2,765,868
METHODS OF AND APPARATUS FOR REMOVING LIQUID
AND VAPOR FRACTIONS FROM FLUID STREAMS
Filed Oct. 31, 1952            2 Sheets-Sheet 2
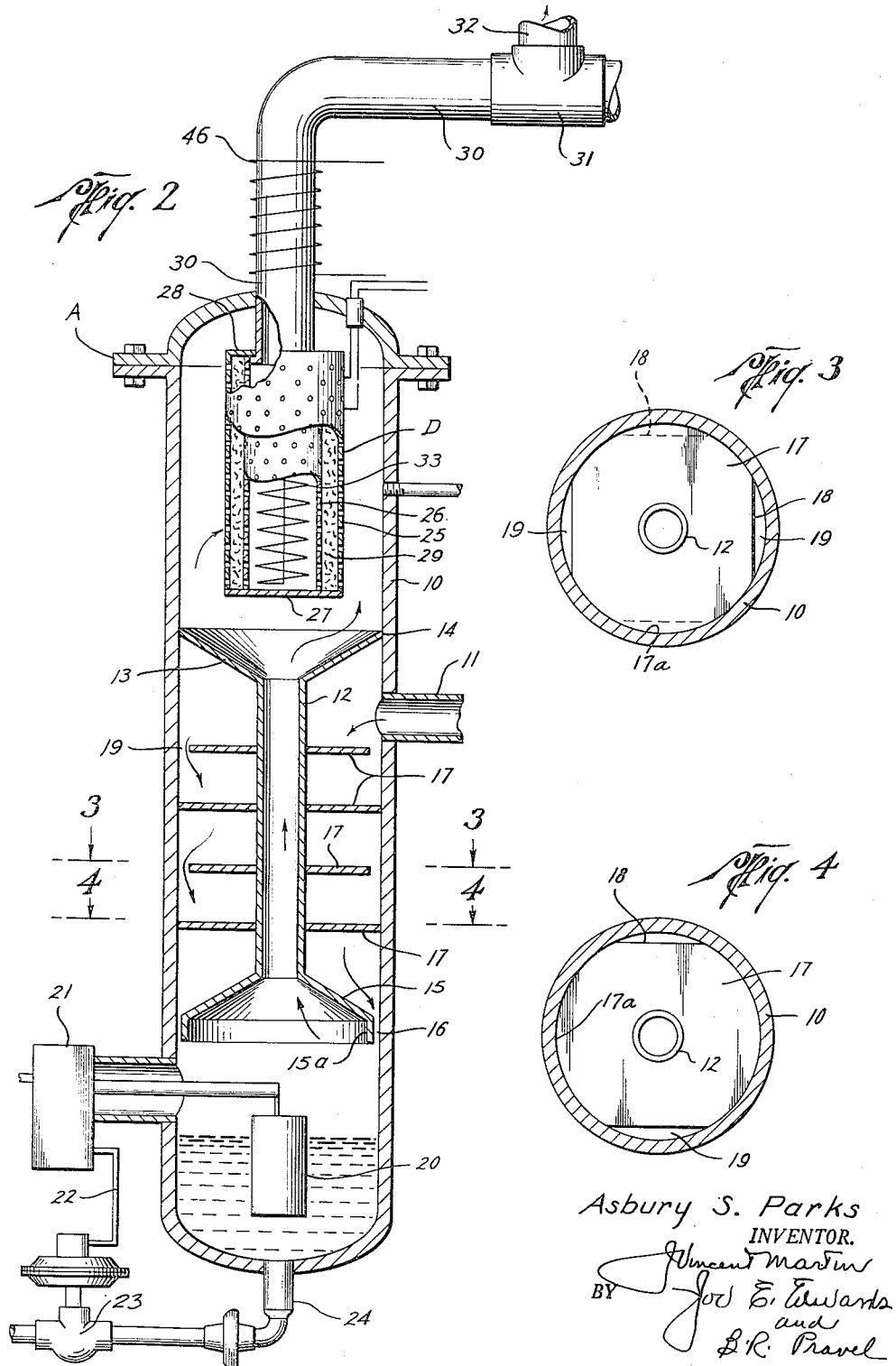
Asbury S. Parks
INVENTOR.
ATTORNEYS United States Patent Office 2,765,868
Patented Oct. 9, 1956

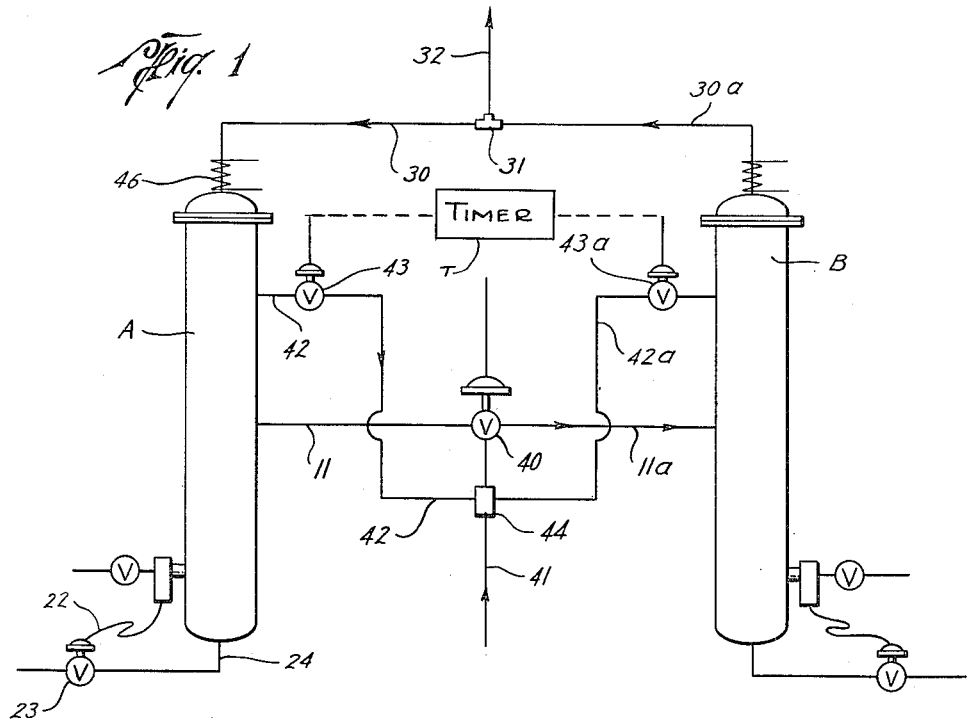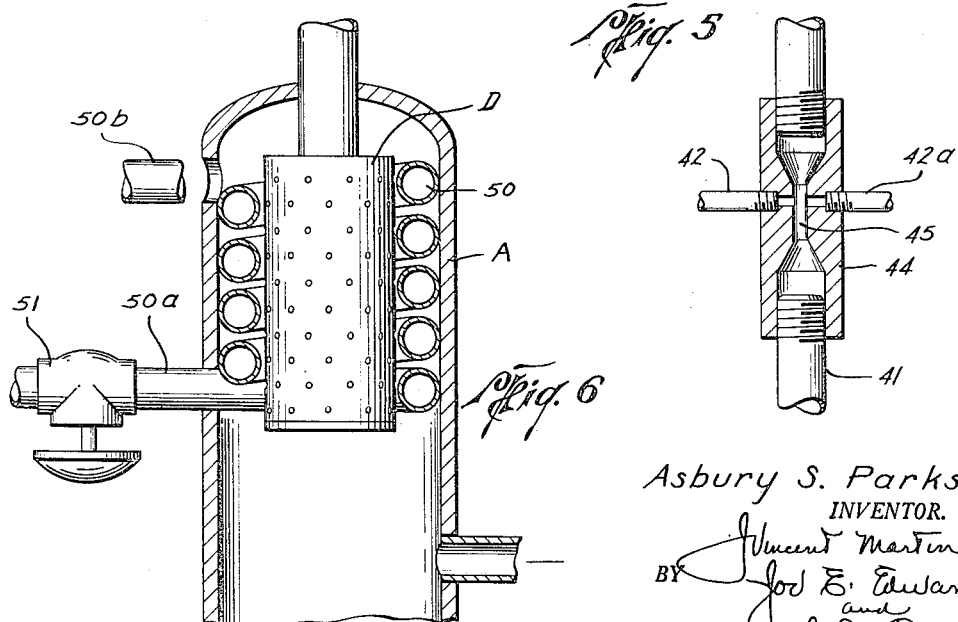

2,765,868

METHODS OF AND APPARATUS FOR REMOVING LIQUID AND VAPOR FRACTIONS FROM FLUID STREAMS

Asbury S. Parks, Houston, Tex.

Application October 31, 1952, Serial No. 317,931

4 Claims. (Cl. 183—4.5)

This invention relates to new and useful improvements in methods of and apparatus for removing liquid and vapor fractions from fluid streams and relates particularly to dehydrating natural gas.

The invention will be described in connection with removing water from high pressure gas streams, but it is to be understood that it is applicable for separating liquid and vapor fractions from fluid streams by preferential adsorption.

As is well known, natural gas, to be acceptable for pipe line use, must be dehydrated to reduce its water vapor content below an established minimum and various methods and processes are now in general use for accomplishing such dehydration. One type of process employs a dry type desiccant, such as activated alumina, silica gel or bauxite, and the gas stream is circulated through the desiccant which functions to remove the water vapor from said stream. Usually a plant employing this type of process involves a separator which initially separates the free liquid-phase constituents from the gas stream, after which the stream is directed to one of a series of desiccant towers wherein dehydration takes place. While one tower is removing water vapor the other tower is out of operation and is being re-activated, with such re-activation ordinarily being accomplished by circulating a hot gas through the desiccant pack in a direction opposite to normal flow.

The heating and controlling of flow of the hot regenerating gas involves an elaborate and expensive valving and control system which in general complicates the operation. Usually steam is used as the heating medium whereby boilers are required and since a hot gas is employed for re-activation, it is necessary to provide a subsequent gas-water separation step in the system, all of which increases the expense and results in a complicated plant operation.

Furthermore, the usual desiccant-type plant is designed to operate at a relatively low pressure in the order of four hundred to one thousand pounds per square inch, because it is not economically feasible to construct the numerous vessels and other units of the plant of sufficient strength and size to withstand the higher pressure. The operation of the plant within the lower pressure range creates a major disadvantage because, as is well known, gas streams at the lower pressures are capable of carrying a greater volume of water vapor than can be carried by a gas stream at the higher pressures. For example, at 400 lbs. p. s. i., and at 100° F., natural gas will carry sixteen gallons of water per million cubic feet, whereas at 4,000 lbs. p. s. i., and 100° F., the gas will carry only 3.2 gallons per million cubic feet. It therefore becomes obvious that when the usual desiccant plant is operated within the lower pressure ranges, a much greater volume of water must be handled which means a larger amount of desiccant is required, and an increased amount of heat is necessary, whereby plant operation is complicated and the expense thereof is increased.

It is one object of this invention to provide an improved method of and apparatus for dehydrating natural gas, wherein a dry type desiccant is employed and wherein the major disadvantages of the present known plants using this type of desiccant, are overcome.

An important object of the invention is to provide an improved method of dehydrating natural gas wherein the method is preferably carried out under relatively high pressure in the order of 3,000 lbs. p. s. i. and above, whereby the water vapor content of the gas stream is at a minimum so that only a minimum volume of water need be handled in carrying out the efficient dehydration of the gas stream; the method permitting the apparatus to be simplified with smaller volume vessels, whereby economic costs are reduced to the point that said apparatus may be used at individual wells.

Still another object is to provide an improved apparatus for dehydrating natural gas, wherein the separator which separates the free liquid constituents from the gas stream is combined in the same vessel with the desiccant tower, whereby a simplified and inexpensive structure is produced.

A further object is to provide a method and apparatus, of the character described, which employs a minimum amount of desiccant for the purpose of dehydrating the gas stream, whereby the reactivation of said desiccant may be accomplished with minimum heat to thereby simplify the overall construction.

Another object is to provide a method which utilizes an indirect heating medium for reactivating the desiccant pack, whereby a high volume of hot gas need not be circulated through said pack which eliminates the necessity for a subsequent gas-water separation step as well as a subsequent gas cooling step.

A particular object of the invention is to provide an improved apparatus, of the character described, including a vessel in which the desiccant pack is disposed, which vessel is not heated but rather remains relatively cool so that its walls may function as a condenser to condense the water vapors which are removed from the desiccant pack during the regeneration or reactivation of said pack.

Still another object is to provide an apparatus for dehydrating gas and comprising, a pair of interconnected vessels, each of which functions as a combined separator and desiccant tower, together with means for directing flow through one vessel while the second vessel is being reactivated; the apparatus including means for circulating a small volume of dry gas through the desiccant pack which is being reactivated to assist the applied heat in the reactivation of said pack.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a diagrammatic view of an apparatus constructed in accordance with the invention for carrying out the improved method of dehydrating gas, Figure 2 is a vertical, sectional view of one of the vessels forming a combined separator and desiccant tower, Figures 3 and 4 are horizontal cross-sectional views, taken on the lines 3—3 and 4—4, respectively, of Figure 2.

Figure 5 is a sectional detail of the venturi at the inlet of the apparatus, and Figure 6 is a sectional view of a modified form of the invention.

In the drawings, the letter A designates a vertically disposed vessel which may be referred to as a combined separator and desiccant tower which is constructed to operate under high pressure. The vessel A is clearly illustrated in Figure 2 and comprises an outer shell or tank 10 having an inlet pipe 11 connected thereto at a point intermediate its upper and lower ends. Within the interior of the vessel is a scrubber assembly which includes an axially disposed conduit 12 having a conical partition 13 extending from its upper end; the periphery of the partition is in engagement with and secured to the vessel wall at 14. A downwardly inclined baffle 15 extends from the lower end of the conduit and has its lower portion terminating in an annular flange or ring portion 15a which is spaced from the inner wall of the vessel to provide an annular flow space 16 around the baffle.

The upper partition 13 is located above the inlet 11 while the inclined baffle 15 is disposed nearer the lower end of the vessel, and between said partition and inclined baffle are a plurality of transverse baffle plates 17. Each baffle plate 17, as shown in Figure 3, extends transversely across the interior of the vessel and is formed with diametrically opposed arcuate edges 17a which conform to the inner wall of said vessel; each baffle is also formed with diametrically opposed straight edges 18 and the areas between the straight edges and the inner wall of the vessel form vertical flow spaces 19. Each baffle 17 is disposed so that the straight edges thereof are located 90° from the straight edges 18 of the adjacent baffles, with the result that the flow spaces 19 of each baffle are staggered in a vertical plane with respect to the flow spaces 19 of the baffles thereabove and therebelow.

The incoming flow stream introduced through the inlet 11 enters the scrubbing assembly below the partition 13 and is directed downwardly into contact with the surfaces of the baffles 17. Upon striking the uppermost baffle the direction of flow is abruptly changed to a direction laterally of the vessel since the fluid can escape downwardly past said baffle only through the flow spaces 19. The fluid then strikes the upper surface of the next baffle and lateral flow is again effected; this action is continued until the fluid finally passes downwardly through the annular flow space 16 around the inclined baffle 15. The impingement of the liquid particles upon the surfaces of the baffles functions to coalesce and accumulate the liquid on the surfaces of the baffles and the liquid ultimately precipitates by gravity into the lower end of the vessel. The constant change of direction of the flowing stream also increases the effectiveness of the separation so that by the time the flow stream passes around and beneath the inclined baffle 15, substantially all free liquid has been separated therefrom. The gas stream then flows upwardly through the conduit 12 and into the upper portion of the vessel.

The lower portion of the vessel forms a liquid-accumulating zone and a liquid level may be maintained therein of the vessel 10 by means of a float 20 which actuates a pilot pressure controller 21. The controller 21 and float mechanism may be of usual construction and function to control the application of pilot pressure through a line 22 to a motor valve 23, said motor valve being connected in a liquid outlet line 24 which extends from the lower end of the vessel. The float and pilot controller operate the valve to dump the liquid from the lower end of the separator when the liquid level rises to a predetermined point therein.

The flow stream which passes upwardly through the conduit 12 enters the upper end of the vessel above the partition 13 and can escape from this upper end only by passing through a desiccant pack assembly D. As is clearly shown in Figure 2, the desiccant pack assembly includes an outer perforated housing 25 and an inner perforated sleeve 26. A base plate 27 extends across and closes the lower ends of the sleeve and housing while an annular plate 28 closes the upper end of the annular space between said housing and said sleeve. A suitable desiccant 29, such as activated alumina, silica gel or bauxite, is disposed between the housing 25 and the sleeve 26 and the gas stream flowing from the interior of the vessel into the sleeve 26 must pass through this material which functions to pick up the water vapor in the gas stream. A conductor 30 is connected to the upper end of the sleeve and conducts the flow stream from the vessel. The conductor 30 has connection through a T 31 with an outlet line or pipe 32.

From the foregoing it will be seen that the flow stream enters the vessel 10, is directed downwardly through the scrubber assembly formed by the baffles and after passing around the lowermost inclined baffle 15 is directed upwardly through the conduit 12. In its passage downwardly through the scrubber assembly the free liquids are separated and precipitated out of the flow stream so that the stream flowing upwardly through conduit 12 is substantially a gaseous stream with a water vapor content. The stream which is directed into the vessel is a high pressure well stream and under such high pressure its water vapor content is at a minimum. There is substantially no pressure reduction within the vessel, and therefore, the gas stream flowing upwardly through conduit 12 into the upper portion of the vessel, still being under high pressure, contains a minimum volume of water. As a result, the desiccant pack 29 can be of minimum thickness because the volume of water which it must handle is at a minimum. As the gas stream passes through the desiccant the water vapor is picked up from the gas and the dry gas passing through the inner sleeve 26 escapes through the outlet conductor 30 to the outlet line 32.

The particular advantage of operating the vessel under high pressure makes it possible to utilize a minimum amount of desiccant and the desiccant pack can therefore be made relatively small. By arranging the pack in an annulus as shown, the gas stream flows into and through the desiccant from all radial directions; obviously the desiccant material is disposed between the interior of the vessel and the outlet 30 and in order to escape the gas must pass through the desiccant to thereby assure that the entire gas stream will be subjected to the action of said desiccant.

When the desiccant pack becomes saturated it is necessary to reactivate or regenerate the same, and this is accomplished by applying heat thereto which will evaporate the water therefrom and dry the desiccant material. For this purpose a heating element 33 is mounted within the bore of the inner sleeve 26 of the desiccant pack assembly, and this heating element may be an electrical coil or it may be a tubular coil member through which a heating medium such as hot gas or steam may be circulated. When the desiccant pack becomes saturated, flow through the vessel is halted and the heating element 33 is actuated to apply heat to the desiccant pack. This heat vaporizes the moisture within the desiccant 29 and drives the same outwardly into the vessel where the vapors contact the relatively cool inner wall of said vessel and are thereby condensed. The condensed particles of water precipitate by gravity downwardly along the inner wall into contact with the inclined partition 13 and then pass downwardly through the conduit into the liquid zone in the lower portion of the vessel.

Since the vessel is operated under high pressure it is possible to employ the relatively small amount of desiccant to dehydrate the gas stream flowing therethrough and thus, the desiccant is handling a minimum amount of water. As a result the heating requirements are considerably less, and it is therefore possible to employ an electrical type heating element for reactivating or regenerating the desiccant. It might be noted that it is not necessary to apply heat to the entire vessel as is the practice in certain prior methods, and actually the relatively cooler vessel is utilized to condense the heated vapors which are driven from the desiccant during the heating operation. It is noted that the condensed water which is removed from the desiccant is conducted back into the same liquid-accumulating zone of the vessel in which the initially separated liquids are contained.

The vessel actually comprises a combined high pressure separator which initially separates the free liquids from the gas stream, and a desiccant tower which functions to remove the water vapor from the gas to dehydrate said gas to the desired point.

In actual operation it is desirable to maintain a continuous flow and to carry out a continuous dehydrating of the flowing high pressure gas stream, and in order to accomplish continuous operation the system and apparatus illustrated in Figure 1 is employed. In such apparatus a second vessel B which is identical in construction to the vessel A has its inlet line 11a connected to one outlet of a three-way control valve 40. The inlet line 11 of the vessel A is also connected to the three-way valve 40 and the incoming flow stream is brought into and through the three-way valve 40 through a main inlet flow pipe 41. By manipulating the valve the incoming flow stream may be selectively directed to either the vessel A or the vessel B. Thus, when the flow stream is conducted through vessel A, the vessel B will be inactive with its heating element 33 being operated to accomplish regeneration or reactivation of its desiccant pack; similarly, when the main flow stream is flowing through vessel B, reactivation of the desiccant pack of vessel A will be carried out.

It may be desirable during the regeneration step of each vessel that a back flow of dry gas through the desiccant pack be accomplished, and for this purpose the dry gas outlet 30a of the vessel B is connected to the T 31 which also has connection with the dry gas outlet 30 of vessel A. Assuming that vessel A is being reactivated the three-way valve 40 is in a position directing flow through the vessel B and dry gas is flowing from the upper end of vessel B through line 30a, T 31 and to outlet pipe 32. For the purpose of conducting a part of this dry gas from line 30a back through the desiccant pack of vessel A a conductor 42 extends from the upper end of vessel A and has a motor valve 43 connected therein. The conductor 42 connects into one side of a venturi nipple 44 which has a venturi throat 45 therein, this nipple being mounted within the main inlet line 41 (Figures 1 and 5). It will be evident that when the motor valve 43 is open with the three-way valve 40 directing flow into vessel B, the flow of incoming well fluids through the venturi nipple 44 (Figure 5) will create a suction in line 42, and this suction will function to draw a small portion of dry gas through line 30 and through the desiccant pack, such flow being in a direction opposite to the normal flow through the desiccant pack during the dehydrating operation. This back flow of dry gas assists in carrying off the vapors evolving from the pack during the heating thereof and also functions to cool the pack after reactivation. If it is desired to further heat the dry gas passing through the desiccant during reactivation, an auxiliary heating element 46 may surround the outlet conductor 30; this heating element may be either an electrical heating coil, a tubular coil through which a heating medium is circulated, or other means.

From the foregoing, it will be evident that during reactivation of vessel A the motor valve 43 may be opened and a circulation of dry gas in a reverse direction through the desiccant will be accomplished. When the main control or three way valve 40 is shifted to direct flow through vessel A the reactivation of vessel B will begin. In order to allow a back flow of dry gas through the desiccant pack of vessel B, this vessel is provided with a conductor 42a extending between the upper end of the vessel and the venturi nipple 44. A suitable motor valve 43a is mounted in this conductor and when such valve is open the incoming flow stream functions to set up the back flow circulation of dry gas through the desiccant pack of vessel B.

The main control valve 40 as well as the motor valves 43 and 43a are schematically illustrated and may be controlled by any suitable timer or any other mechanism which is indicated at T in Figure 1. A single controller may control the operation of the three valves at the proper time. The particular heating elements 33 of the desiccant packs may also be controlled by the same timer since obviously these heating elements are actuated on substantially the same time cycle as the valves. The auxiliary heating elements 46 would also be under control of the same controller. Of course, if automatic operation is not desired the various valves and heating elements could be manually actuated.

In some instances the relatively cool wall of the vessel may be inadequate to effect complete condensation of the water vapor driven off through the heating of the desiccant pack assembly D and it may be desirable to provide an additional condensing element. In Figure 6 such additional condensing element is illustrated in the form of an enlarged coil of pipe 50 which is located within the same chamber as the desiccant pack assembly; as shown, the coil surrounds said assembly, but the element may take other forms. Any suitable coolant such as the gas stream being processed may be circulated through the element 50 for the purpose of condensing the water vapor. A suitable valve 51 which may be controlled either automatically or manually controls the flow of the coolant through said element 50. If the gas stream being processed is employed as the cooling medium then the inlet end 50a of the coil 50, as well as the outlet end 50b, are connected with the gas stream line. It is not essential that the gas stream being processed be utilized as the cooling medium, but since it is readily available and ordinarily has a temperature sufficiently low for the purpose, its use may be found more convenient.

From the foregoing it will be seen that a very simple and efficient gas dehydrating apparatus is provided. Each vessel comprises a combined separator and desiccant tower with the separator portion effecting a separation of the free liquids from the high pressure gas stream. Since the unit is operated under high pressure the gas stream flowing upwardly through the conduit 12 from the liquid zone of the separator contains a minimum water vapor content, and therefore only a minimum amount of desiccant within the pack is required. Upon flowing through the desiccant pack the water vapor is removed and the dry gas is conducted outwardly through the gas outlet pipe 32. Reactivation of the saturated pack can be effected with minimum heat and during such reactivation the relatively cool wall of the vessel functions to condense the water vapors which are driven off from the pack during the heating thereof. The water removed from the desiccant pack is returned to the same liquid-accumulating zone which receives the initially separated free liquids and thus, a very simple system is provided.

The invention has been described as dehydrating a natural gas stream, but it is evident that it may be employed for separating liquid and vapor fractions from fluid streams by preferential adsorption. By proper selection of the adsorbing medium which would be substituted for the particular desiccant pack, the separation of selected vapor fractions from the fluid stream may be accomplished.

The particular system and method has been found extremely satisfactory in separating liquid and vapor fractions from streams under relatively high pressures; however, the apparatus and method would operate just as efficiently under lower pressure, with the exception that a lesser volume of gas could be handled therethrough.

The foregoing disclosure and description of the invention is illustrative and explanatory thereof, and various changes in the size, shape and materials, as well as in the details of the illustrated construction may be made, within the scope of the appended claims, without departing from the spirit of the invention.

Having described the invention, I claim:

1. The method of dehydrating high pressure fluid streams including, flowing the stream under high pressure into a vessel to cause the free liquids to precipitate downwardly therein, directing the stream upwardly within the vessel and through a desiccant pack to remove the water vapor therefrom, conducting the dehydrated stream from the upper end of the vessel, conducting the separated liquids while in the liquid phase from the lower end of said vessel, halting the flow of the stream through the vessel when the desiccant pack becomes saturated, applying heat to said desiccant pack to vaporize the water contained therein to reactivate said pack without heating the walls of the vessel, and directing the vaporized water into contact with the relatively cool wall of the vessel to condense the vaporized water which is driven from the pack, whereby the condensed water precipitates downwardly into the lower portion of the vessel.

2. An apparatus for dehydrating high pressure fluid streams including, a high pressure vertically disposed vessel having a fluid stream inlet in its wall, a scrubber assembly within the vessel, means within the vessel for directing the incoming fluid stream in a downward direction through the scrubber assembly whereby the free liquids in said stream precipitate into the lower portion of the vessel, a vertical conductor within the vessel extending through the scrubber assembly for conducting the stream upwardly from the lower portion to the upper portion of the vessel above said assembly, an adsorbent pack within the upper portion of the vessel, a gas outlet in the upper end of the vessel beyond the adsorbent pack, whereby the stream flowing to the gas outlet is directed through the adsorbent pack to effect removal of certain vapor fractions from the stream, a liquid outlet extending from the lower end of the vessel for conducting liquid in the liquid phase therefrom, said adsorbent pack being a desiccant pack which is located axially within the vessel and which comprises an outer perforated housing, an inner perforated sleeve element of lesser diameter mounted axially within the housing, a desiccant material within the annular space between said housing and said sleeve, flow of the fluid stream through the desiccant pack being in a radial direction from the exterior of the housing to the interior of the sleeve, a heating means disposed within the desiccant pack for applying heat thereto to reactivate the same after it has become saturated, and a condensing element mounted within the vessel for condensing the vapors driven off by the heat applied during reactivation of the desiccant pack.

3. The method of dehydrating high pressure fluid streams including, flowing the stream under high pressure into a vessel to cause the free liquids to precipitate downwardly therein, directing the stream into a desiccant pack within the vessel to remove the water vapor therefrom, conducting the dehydrated stream from the vessel, conducting the separated liquids while in the liquid phase from the lower end of said vessel, halting the flow of the stream through the vessel when the desiccant pack becomes saturated, applying heat to said desiccant pack to vaporize the water contained therein to reactivate said pack without heating the walls of the vessel, and directing the vaporized water into contact with the relatively cool wall of the vessel to condense the vaporized water which is driven from the pack, whereby the condensed water precipitates downwardly into the lower portion of the vessel.

4. An apparatus for dehydrating high pressure fluid streams including, a vertically disposed vessel, a desiccant pack mounted axially within the vessel and of an outer diameter less than the inner diameter of the vessel whereby a flow space is provided between the pack and the vessel wall, an inlet connected in the wall of the vessel for conducting a high pressure fluid stream into the vessel to cause the free liquids to precipitate downwardly therein, a liquid outlet at the lower end of the vessel for conducting liquids in the liquid phase from the vessel, means for directing the fluid stream through the desiccant pack to remove the water vapor therefrom, an outlet extending from the vessel for conducting the dehydrated stream from the vessel, means associated with the inlet for shutting off the flow of the high pressure fluid stream when the pack becomes saturated, heating means for applying heat to the saturated desiccant pack without heating the desiccant walls to vaporize the water contained in the pack, and means for directing the vaporized water from the pack and into the annular space between the pack and the relatively cool wall of the vessel, whereby said vaporized water is condensed and precipitates downwardly into the lower portion of the vessel.

References Cited in the file of this patent

UNITED STATES PATENTS

| 1,443,435 | Rohrer | Jan. 30, 1923 |
| 1,522,111 | Philipson | Jan. 6, 1925 |
| 1,661,104 | Barneby | Feb. 28, 1928 |
| 1,716,480 | Bilsky | June 11, 1929 |
| 2,083,732 | Moore et al. | June 15, 1937 |
| 2,214,737 | Dauphinee | Sept. 17, 1940 |
| 2,400,179 | Venable | May 14, 1946 |
| 2,504,184 | Dawson | Apr. 18, 1950 |
| 2,535,902 | Dailey | Dec. 26, 1950 |
| 2,621,752 | Riley | Dec. 16, 1952 |
| 2,665,769 | Walker et al. | Jan. 12, 1954 |

FOREIGN PATENTS

| 28,406 | Great Britain | Dec. 27, 1904 |